(12) United States Patent
Kim et al.

(10) Patent No.: US 11,499,727 B2
(45) Date of Patent: Nov. 15, 2022

(54) AIR CONDITIONING APPARATUS

(71) Applicant: LG Electronics Inc., Seoul (KR)

(72) Inventors: Donghwi Kim, Seoul (KR);
Hyungjoon Kim, Seoul (KR);
Junseong Park, Seoul (KR);
Yongcheol Sa, Seoul (KR)

(73) Assignee: LG Electronics Inc., Seoul (KR)

( * ) Notice: Subject to any disclaimer, the term of this patent is extended or adjusted under 35 U.S.C. 154(b) by 206 days.

(21) Appl. No.: 16/738,289

(22) Filed: Jan. 9, 2020

(65) Prior Publication Data
US 2020/0309392 A1 Oct. 1, 2020

(30) Foreign Application Priority Data
Mar. 27, 2019 (KR) .................. 10-2019-0035113

(51) Int. Cl.
| | |
|---|---|
| *F24F 1/16* | (2011.01) |
| *F28F 27/02* | (2006.01) |
| *F25B 41/40* | (2021.01) |
| *F24F 13/30* | (2006.01) |
| *F24F 1/0063* | (2019.01) |
| *F25B 13/00* | (2006.01) |

(Continued)

(52) U.S. Cl.
CPC .............. *F24F 1/16* (2013.01); *F24F 1/0063* (2019.02); *F24F 13/30* (2013.01); *F25B 13/00* (2013.01); *F25B 41/26* (2021.01); *F25B 41/31* (2021.01); *F25B 41/34* (2021.01); *F25B 41/40* (2021.01); *F28F 27/02* (2013.01); *F28F 2250/06* (2013.01); *Y02B 30/70* (2013.01)

(58) Field of Classification Search
CPC .. F24F 1/16; F24F 1/0063; F24F 13/30; F24F 5/00; F24F 13/02; F24F 5/0003; F24F 5/001; F25B 13/00; F25B 41/34; F25B 5/02; F25B 6/02; F25B 41/385; F25B 41/26; F25B 41/31; F25B 41/40; F28F 27/02; F28F 2250/06; Y02B 30/70
See application file for complete search history.

(56) References Cited

U.S. PATENT DOCUMENTS

| | | | | | |
|---|---|---|---|---|---|
| 4,104,044 | A | * | 8/1978 | Lange ................. | B01D 35/18 210/DIG. 6 |
| 7,185,505 | B2 | * | 3/2007 | Kamimura ........... | F25B 29/003 62/238.7 |

(Continued)

FOREIGN PATENT DOCUMENTS

| | | |
|---|---|---|
| CN | 103443556 | 12/2013 |
| CN | 106030219 | 10/2016 |

(Continued)

OTHER PUBLICATIONS

Extended European Search Report in European Appln. No. 20158133.7, dated Jul. 28, 2020, 4 pages.

(Continued)

*Primary Examiner* — Ljiljana V. Ciric
(74) *Attorney, Agent, or Firm* — Fish & Richardson P.C.

(57) ABSTRACT

An air conditioning apparatus includes a heat exchange device that connects an outdoor unit to an indoor unit and that includes a heat exchanger configured to perform heat exchange between refrigerant and water. The heat exchanger reduces an amount of refrigerant used to perform a cooling operation or a heating operation.

20 Claims, 9 Drawing Sheets

(51) Int. Cl.
*F25B 41/26* (2021.01)
*F25B 41/31* (2021.01)
*F25B 41/34* (2021.01)

(56) References Cited

U.S. PATENT DOCUMENTS

| | | | | |
|---|---|---|---|---|
| 8,820,106 | B2* | 9/2014 | Wakamoto | F25B 13/00 62/238.7 |
| 9,316,421 | B2* | 4/2016 | Tanaka | F25B 13/00 |
| 9,587,843 | B2* | 3/2017 | Yamashita | F24F 3/06 |
| 11,209,204 | B2* | 12/2021 | Gopalnarayanan | F25B 41/39 |
| 11,371,755 | B2* | 6/2022 | Maruyama | F24F 11/83 |
| 2004/0035132 | A1* | 2/2004 | Park | F25B 13/00 62/197 |
| 2005/0066678 | A1* | 3/2005 | Kamimura | F25B 29/003 62/238.7 |
| 2006/0191286 | A1* | 8/2006 | Park | F25B 13/00 62/434 |
| 2008/0028773 | A1* | 2/2008 | Lee | F25B 13/00 165/240 |
| 2008/0196432 | A1 | 8/2008 | Shimimoto et al. | |
| 2008/0264075 | A1* | 10/2008 | Seefeldt | F25B 1/10 62/81 |
| 2009/0145151 | A1* | 6/2009 | Wakamoto | F25B 9/008 62/259.1 |
| 2009/0158761 | A1* | 6/2009 | Wakamoto | F25B 13/00 62/175 |
| 2010/0282434 | A1* | 11/2010 | Yabuuchi | F25B 13/00 62/238.7 |
| 2010/0282435 | A1* | 11/2010 | Yabuuchi | F24D 17/0073 165/63 |
| 2011/0088421 | A1* | 4/2011 | Wakamoto | F25B 13/00 62/238.7 |
| 2011/0113802 | A1* | 5/2011 | Wakamoto | F24F 3/06 62/196.1 |
| 2011/0192184 | A1* | 8/2011 | Yamashita | F25B 13/00 62/196.1 |
| 2011/0232308 | A1* | 9/2011 | Morimoto | F25B 13/00 62/278 |
| 2011/0259027 | A1* | 10/2011 | Choi | F24F 1/0003 62/238.7 |
| 2012/0036887 | A1* | 2/2012 | Wakamoto | F25B 13/00 62/513 |
| 2012/0042678 | A1* | 2/2012 | Park | F24D 19/1072 62/324.1 |
| 2013/0104574 | A1* | 5/2013 | Dempsey | F24D 17/02 62/159 |
| 2013/0219937 | A1* | 8/2013 | Motomura | F25B 13/00 62/126 |
| 2013/0227976 | A1* | 9/2013 | Yamashita | F25B 49/02 62/126 |
| 2013/0305758 | A1 | 11/2013 | Matsui | |
| 2014/0007607 | A1 | 1/2014 | Tamura et al. | |
| 2014/0033750 | A1* | 2/2014 | Tanaka | F25B 13/00 62/151 |
| 2014/0290292 | A1* | 10/2014 | Kato | F25B 40/00 62/190 |
| 2015/0027154 | A1* | 1/2015 | Lee | F25B 30/02 62/160 |
| 2016/0245539 | A1 | 8/2016 | Motomura et al. | |
| 2017/0219264 | A1 | 8/2017 | Song et al. | |
| 2017/0234590 | A1* | 8/2017 | Tashiro | F25B 13/00 62/156 |
| 2017/0248349 | A1* | 8/2017 | Kujak | F25B 13/00 |
| 2019/0212024 | A1* | 7/2019 | Zhou | F25B 40/00 |
| 2020/0182516 | A1* | 6/2020 | Maruyama | F24F 11/81 |
| 2020/0309417 | A1* | 10/2020 | Kim | F25B 13/00 |

FOREIGN PATENT DOCUMENTS

| | | |
|---|---|---|
| EP | 1533154 | 5/2005 |
| EP | 2390588 | 11/2011 |
| JP | 2007263444 | 10/2007 |
| KR | 10-20085-0045552 | 5/2008 |
| KR | 20130127531 | 11/2013 |
| KR | 20160091298 | 8/2016 |

OTHER PUBLICATIONS

International Search Report in International Appln. No. PCT/KR2019/018378, dated Apr. 3, 2020, 3 pages.
Office Action in Chinese Appln. No. 201980093669.0, dated Jun. 24, 2022, 18 pages (with English translation).

* cited by examiner

AIR CONDITIONING APPARATUS

CROSS-REFERENCE TO RELATED APPLICATIONS

The present application claims priority under 35 U.S.C. 119 and 35 U.S.C. 365 to Korean Patent Application No. 10-2019-0035113, filed on Mar. 27, 2019, the disclosure of which is hereby incorporated by reference in its entirety.

TECHNICAL FIELD

The present disclosure relates to an air conditioning apparatus.

BACKGROUND

Air conditioning apparatus may maintain air within a space to a proper state according to a use and purpose thereof. In some examples, an air conditioning apparatus may include a compressor, a condenser, an expansion device, and evaporator. The air conditioning apparatus may have a refrigerant cycle in which compression, condensation, expansion, and evaporation processes of a refrigerant are performed to heat or cool a space.

The air conditioning apparatus may be used in various places. For example, the air conditioning apparatus may be used in home or an office.

In some cases, when the air conditioning apparatus performs a cooling operation, an outdoor heat-exchanger provided in an outdoor unit may serve as a condenser, and an indoor heat-exchanger provided in an indoor unit may serve as an evaporator. In some cases, when the air conditioning apparatus performs a heating operation, the indoor heat-exchanger may serve as the condenser, and the outdoor heat-exchanger may serve as the evaporator.

In recent years, according to environmental regulations, there is a tendency to limit the type of refrigerant used in the air conditioning apparatus and to reduce an amount of refrigerant used. To reduce an amount of refrigerant used, an air conditioning system may perform cooling or heating by performing heat exchange between refrigerant and fluid (e.g., water).

In some cases, a plate-type heat exchanger may exchange heat between refrigerant and water to generate heat, thereby performing cooling, heating, hot water supply, or cold water supply. In some cases, a refrigerant passage is provided in the same manner regardless of whether the plate-type heat exchanger functions as a condenser or an evaporator, which may deteriorate heat exchange performance.

In some cases, in the plate-type heat exchanger, flow directions of refrigerant and water may be opposite to each other to generate a counter flow, thereby improving heat exchange performance.

In some cases, where the plate-type heat exchanger acts as an evaporator, the refrigerant and the water may flow in the same direction to generate a parallel flow, which may deteriorate the heat exchange performance.

SUMMARY

The present disclosure describes an air conditioning apparatus in which a water passage varies in a heat exchange device during cooling operation or heating operation to generate a counter flow between water and a refrigerant so as to perform heat exchange between the refrigerant and the water, thereby improving the heat exchange performance.

The present disclosure also describes an air conditioning apparatus in which an outdoor unit and a heat exchange device are connected to each other through two pipes to simplify a configuration thereof when a switching operation for a cooling operation or a heating operation is performed.

In some implementations, the outdoor unit and the heat exchange device may be connected to each other through three pipes to easily perform circulation of a refrigerant during a simultaneous operation in which the cooling operation and the heating operation are performed at the same time.

The present disclosure also describes an air conditioning apparatus in which the configuration of a heat exchange device connected to an outdoor unit through two pipes and the configuration of a heat exchange device connected to the outdoor unit through three pipes are almost similar to each other except that the pipes are grounded so that the heat exchange device for a switching operation or a simultaneous operation is easily manufactured.

In some implementations, the heat exchange device may be connected to the outdoor unit through the two or three pipes to perform the switching operation or the simultaneous operation according to operation requirements, thereby improving a degree of freedom of installation.

In some implementations, where the heat exchange device is connected to the outdoor unit through two pipes or three pipes, the connection to the outdoor unit may be easily performed according to requirements of the operation of the air conditioning apparatus, i.e., a switching operation or a simultaneous operation.

In some implementations, where a passage and a valve structure vary flow of water in the heat exchange device, the refrigerant passage may be differently provided according to whether to perform the cooling operation or the heating operation during the switching operation. When the cooling and heating operations are performed in the heat exchange device, a count flow may be generated between the refrigerant and the water to improve heat exchange performance.

In some implementations, where water flowing from the indoor unit to the heat exchange device is, during the cooling operation, bypassed to be introduced through a first outlet part of the heat exchange device and to be discharged through a second outlet part, water may flow in a direction that is opposite to the flow direction of the refrigerant introduced into the heat exchange device.

In some implementations, where water discharged from the indoor unit is, during the heating operation, introduced through a second outlet part and discharged through a first outlet part, water may flow in a direction that is opposite to the flow direction of the refrigerant introduced into the heat exchange device.

According to one aspect described in this application, an air conditioning apparatus includes an outdoor unit configured to circulate refrigerant; an indoor unit configured to circulate water; and a heat exchange device that connects the outdoor unit to the indoor unit, the heat exchange device comprising a heat exchanger configured to exchange heat between the refrigerant and the water. The heat exchange device includes: a first heat exchanger water pipe that extends from the heat exchanger toward an outlet of the indoor unit and that is configured to guide water received from the indoor unit, a second heat exchanger water pipe that extends from the heat exchanger toward an inlet of the indoor unit and that is configured to guide water to the inlet of the indoor unit, a bypass pipe that extends from the first heat exchanger water pipe to the second heat exchanger water pipe and that is configured to bypass water flowing through the first heat exchanger water pipe to the second heat exchanger water pipe, and a switching valve installed in the bypass pipe.

Implementations according to this aspect may include one or more of the following features. For example, the bypass pipe may include a first bypass pipe that extends from a first branch part disposed at the first heat exchanger water pipe to a first combining part disposed at the second heat exchanger water pipe. In some examples, the switching valve may include a first switching valve installed in the first bypass pipe.

In some implementations, the bypass pipe may further include a second bypass pipe that extends from a second branch part disposed at the first heat exchanger water pipe to a second combining part disposed at the second heat exchanger water pipe. In some examples, the switching valve may include a first switching valve installed in the first bypass pipe and a second switching valve installed in the second bypass pipe.

In some implementations, the air conditioning apparatus may further include a third switching valve installed in the first heat exchanger water pipe. In some examples, the third switching valve is installed between the first branch part and the second branch part of the first heat exchanger water pipe. In some implementations, the air conditioning apparatus may further include a fourth switching valve installed in the second heat exchanger water pipe. In some examples, the fourth switching valve is installed between the first combining part and the second combining part of the second heat exchanger water pipe.

In some implementations, the air conditioning apparatus may further include: a first outdoor unit connection pipe and a second outdoor unit connection pipe that connect the outdoor unit to the heat exchange device; a first heat exchanger refrigerant pipe that is connected to the first outdoor unit connection pipe and that extends to a first port of the heat exchanger; and a second heat exchanger refrigerant pipe that is connected to the second outdoor unit connection pipe and that extends to a second port of the heat exchanger.

In some examples, the first heat exchanger water pipe connects to a third port of the heat exchanger, and the second heat exchanger water pipe connects to a fourth port of the heat exchanger. In some examples, the heat exchanger may include: a refrigerant passage that extends from the first port to the second port and that is configured to guide the refrigerant in the heat exchanger along a first direction; and a water passage that extends from the third port to the fourth port and that is configured to guide the water in the heat exchanger along a second direction opposite to the first direction.

In some examples, the first port and the second port are disposed at a first surface of the heat exchanger, and the third port and the fourth port are disposed at a second surface of the heat exchanger. The first port and the fourth port face each other, and the second port and the third port face each other.

In some implementations, the indoor unit may include a first indoor unit and a second indoor unit, and the heat exchanger may include a first heat exchanger fluidly connected to the first indoor unit and a second heat exchanger fluidly connected to the second indoor unit. The first heat exchanger refrigerant pipe and the second heat exchanger refrigerant pipe are connected to the first heat exchanger.

In some implementations, the air conditioning apparatus may further include: a third outdoor unit connection pipe that connects the outdoor unit to the heat exchange device; a third heat exchanger refrigerant pipe that is connected to the third outdoor unit connection pipe and that extends to a first port of the second heat exchanger; and a fourth heat exchanger refrigerant pipe that extends from the second heat exchanger refrigerant pipe to a second port of the second heat exchanger.

In some implementations, the air conditioning apparatus may further include an internal expansion valve installed in the fourth heat exchanger refrigerant pipe. In some implementations, the heat exchanger may include a plate-type heat exchanger.

According to another aspect, an air conditioning apparatus includes: an outdoor unit configured to circulate refrigerant; an indoor unit configured to circulate water; and a heat exchange device that connects the outdoor unit to the indoor unit, the heat exchange device comprising a plate-type heat exchanger configured to perform heat exchange between the refrigerant and the water. The heat exchange device includes: a plurality of heat exchanger water pipes that connect the plate-type heat exchanger to the indoor unit and that are configured to guide water between the indoor unit and the plate-type heat exchanger; an outdoor unit connection pipe that connects the outdoor unit to the heat exchange device; at least one heat exchanger refrigerant pipe that is connected to the outdoor unit connection pipe and that extends to a port of the plate-type heat exchanger; and at least one bypass pipe that connects the plurality of heat exchanger water pipes to each other and that is configured to bypass water flowing through one of the plurality of heat exchanger water pipes to another of the plurality of heat exchanger water pipes.

Implementations according to this aspect may include one or more of the following features. For examples, the plurality of heat exchanger water pipes may include a first heat exchanger water pipe and a second heat exchanger water pipe. The at least one bypass pipe may include: a first bypass pipe that extends from a first branch part disposed at the first heat exchanger water pipe to a first combining part disposed at the second heat exchanger water pipe; and a second bypass pipe that extends from a second branch part disposed at the first heat exchanger water pipe to a second combining part disposed at the second heat exchanger water pipe.

In some implementations, the outdoor unit connection pipe may include a first outdoor unit connection pipe and a second outdoor unit connection pipe. The at least one heat exchanger refrigerant pipe may include: a first heat exchanger refrigerant pipe that is connected to the first outdoor unit connection pipe and that extends to a first port of the plate-type heat exchanger; and a second heat exchanger refrigerant pipe that is connected to the second outdoor unit connection pipe and that extends to a second port of the plate-type heat exchanger.

The details of one or more implementations are set forth in the accompanying drawings and the description below. Other features will be apparent from the description and drawings, and from the claims.

DETAILED DESCRIPTION

Hereinafter, exemplary implementations will be described with reference to the accompanying drawings. The disclosure may, however, be implemented in many different forms and should not be construed as being limited to the implementations set forth herein. Alternate implementations included in other retrogressive disclosures or falling within the spirit and scope of the present disclosure will fully convey the concept of the disclosure to those skilled in the art.

Figure 1:
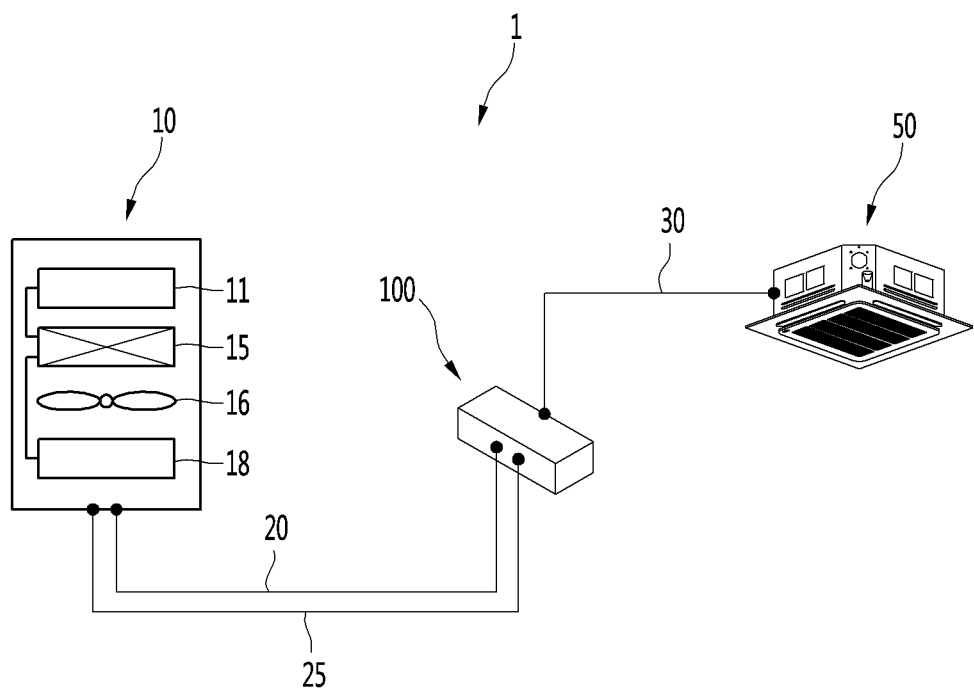
FIG. 1 is a schematic view illustrating an example of an air conditioning apparatus.

FIG. 1 is a schematic view illustrating an example of an air conditioning apparatus.

Referring to FIG. 1, an air conditioning apparatus 1 includes an outdoor unit 10, an indoor unit 50, and a heat exchange device 100 connected to the outdoor unit 10 and the indoor unit 50.

The outdoor unit 10 and the heat exchange device 100 may be fluidly connected by a first fluid. For example, the first fluid may include a refrigerant. The refrigerant may flow through a refrigerant-side passage of a heat exchanger provided in the heat exchange device 100 and the outdoor unit 10.

The outdoor unit 10 may include a compressor 11 and an outdoor heat exchanger 15. An outdoor fan 16 may be provided at one side of the outdoor heat exchanger 15 to blow external air toward the outdoor heat exchanger 15 so that heat exchange between the external air and the refrigerant of the outdoor heat exchanger 15 is performed. Also, a main expansion valve 18 may be further provided in the outdoor unit 10. In some examples, the main expansion valve 18 may be an electronic device. For instance, the main expansion valve 18 may be a fluidic device configured to be controlled by a controller.

The air conditioning apparatus 1 further include two pipes 20 and 25 connecting the outdoor unit 10 to the heat exchange device 100. The two pipes 20 and 25 include a first outdoor unit connection pipe 20 as a gas pipe through which a gas refrigerant flows and a second outdoor unit connection pipe 25 as a liquid pipe through which a liquid refrigerant flows. That is, the outdoor unit 10 and the heat exchange device 100 may have a "two pipe connection structure," and the refrigerant may circulate through the outdoor unit 10 and the heat exchange device 100 via the two pipes 20 and 25.

The heat exchange device 100 and the indoor unit 50 may be fluidly connected by a second fluid. For example, the second fluid may include water. The water may flow through a water-side passage of a heat exchanger provided in the heat exchange device 100 and the indoor unit 50.

That is, the heat exchanger includes the refrigerant-side passage and the water-side passage. For example, the heat exchanger may include a plate-type heat exchanger in which the water and the refrigerant are heat-exchanged with each other.

The air conditioning apparatus 1 further includes an indoor unit connection pipe 30 connecting the heat exchange device 100 to the indoor unit 50. The water may circulate through the heat exchange device 100 and the indoor unit 50 via the indoor unit connection pipe 30.

Although the heat exchange device 100 and one indoor unit 50 are connected to each other in FIG. 1, the implementation is not limited thereto. For example, a plurality of indoor units may be connected to one heat exchange device 100. When the number of indoor units increases, the number of connection pipes connecting the heat exchange device 100 to the indoor units may also increase.

The refrigerant circulating through the outdoor unit 10 and the heat exchange device 100 and the water circulating through the heat exchange device 100 and the indoor unit 50 may be heat-exchanged with each other through the heat exchanger 110 (see FIG. 2) provided in the heat exchange device 100, and water cooled or heated through the heat exchange may be heat-exchanged with an indoor heat exchanger 51 (see FIG. 2) provided in the indoor unit 50 to perform cooling or heating in an indoor space.

Figure 2:
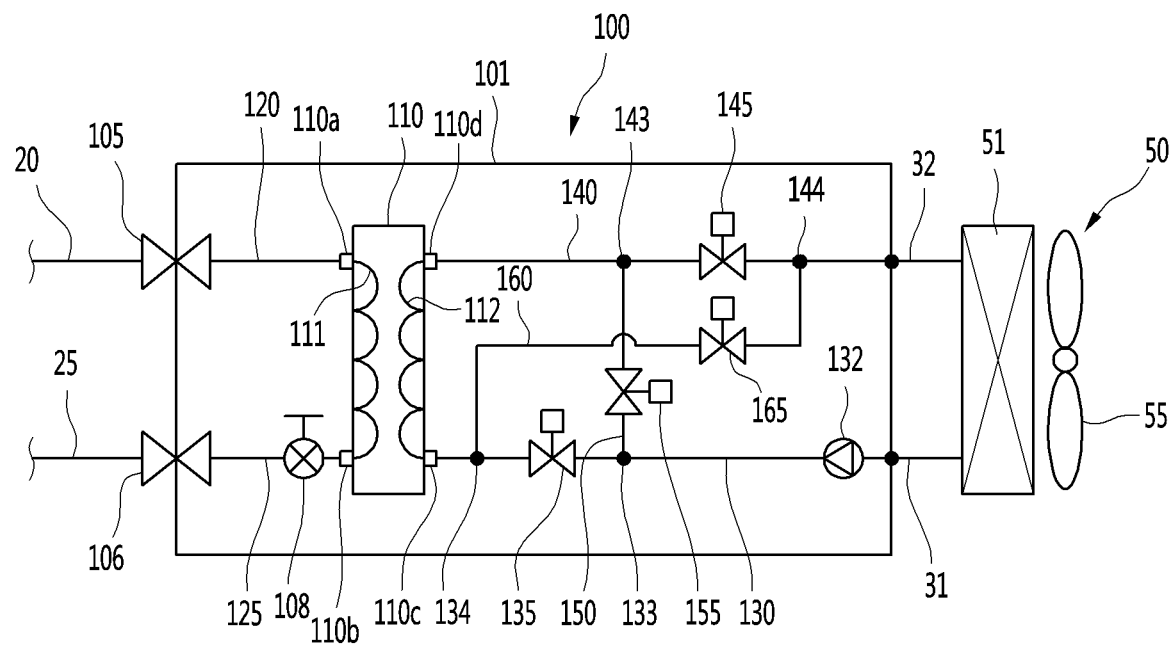
FIG. 2 is a cycle diagram illustrating an example of a heat exchange device.

FIG. 2 is a cycle diagram illustrating an example of the heat exchange device.

Referring to FIG. 2, the heat exchange device 100 includes a device case 101. The heat exchanger 110, the refrigerant pipe, the water pipe, a plurality of valves, and a pump may be provided in the device case 101.

In detail, the heat exchanger 110 fluidly connected to the indoor unit 50 is provided in the heat exchange device 100. The heat exchanger 110 may include a plate-type heat exchanger and be configured so that the water passages and the refrigerant passages are alternately stacked with each other.

The heat exchanger 110 includes a refrigerant passage 111 and a water passage 112. The refrigerant passage 111 may be fluidly connected to the outdoor unit 10. Thus, the refrigerant discharged from the outdoor unit 10 may be introduced into the refrigerant passage 111, or the refrigerant passing through the refrigerant passage 111 may be introduced into the outdoor unit 10.

The water passage 112 may be fluidly connected to the indoor unit 50. Thus, the water discharged from the indoor unit 50 may be introduced into the water passage 112, or the water passing through the water passage 112 may be introduced into the indoor unit 50.

The heat exchange device 100 further include a first service valve 105 connected to the first outdoor unit connection pipe 20 and a second service valve 106 connected to the second outdoor unit connection pipe 25. The first and second outdoor unit connection pipes 20 and 25 may be connected to the heat exchange device 100 through the first and second service valves 105 and 106, and thus, the outdoor unit 10 and the heat exchange device 100 may realize "second pipe connection."

The heat exchange device 100 may further include a first heat exchanger refrigerant pipe 120 extending from the first service valve 105 to the first heat exchanger 110. The first heat exchanger refrigerant pipe 120 may be coupled to a first port 110a of the heat exchanger 110 and be fluidly connected to the refrigerant passage 111. In some examples, the first heat exchanger refrigerant pipe 120 may be implemented with a tube. In some cases, the tube may be flexible and connect between components.

The first heat exchanger refrigerant pipe 120 may be fluidly connected to the first outdoor unit connection pipe 20. For example, when the heating operation is performed, a high-pressure refrigerant compressed in the compressor 11 of the outdoor unit 10 may be introduced into the first heat exchanger refrigerant pipe 120 through the first outdoor unit connection pipe 20 and then be introduced into the heat exchanger 110.

The heat exchange device 100 may further include a second heat exchanger refrigerant pipe 125 extending from the second service valve 106 to the first heat exchanger 110. The second heat exchanger refrigerant pipe 125 may be coupled to a second port 110b of the first heat exchanger 110 and be fluidly connected to the refrigerant passage 111. In some examples, the second heat exchanger refrigerant pipe 125 may be implemented with a tube. In some cases, the tube may be flexible and connect between components.

The first and second ports 110a and 110b may be disposed on both ends of the refrigerant passage 111.

The second heat exchanger refrigerant pipe 125 may be fluidly connected to the second outdoor unit connection pipe 25. For example, when the cooling operation is performed, a high-pressure liquid refrigerant condensed in the outdoor heat exchanger 15 of the outdoor unit 10 may be introduced into the second heat exchanger refrigerant pipe 125 through the second outdoor unit connection pipe 25.

An internal expansion valve 108 that is capable of decompressing the refrigerant may be installed in the second heat exchanger refrigerant pipe 125. For example, the internal expansion valve 108 may include an electronic expansion valve (EEV).

The EEV may adjust a degree of opening thereof to allow a pressure of the refrigerant passing through the expansion valve to drop down. For example, when the expansion valve is fully opened, the refrigerant may pass through the expansion valve without dropping down, and when the degree of opening of the expansion valve decreases, the refrigerant may be decompressed. A degree of decompression of the refrigerant may increase as the degree of opening decreases.

When the air conditioning apparatus performs the cooling operation, the high-pressure liquid refrigerant introduced from the outdoor unit 10 to the second heat exchanger refrigerant pipe 125 may be decompressed in the internal expansion valve 108 and then phase-changed into a low-pressure two-phase refrigerant. Also, the refrigerant that is changed in phase may be introduced into the refrigerant passage 111 of the heat exchanger 110.

The heat exchange device 100 further include a first heat exchanger water pipe 130 and a second heat exchanger water pipe 140, which are connected to the water passage 112 of the heat exchanger 110. Also, the indoor unit connection pipe 30 includes a first indoor unit connection pipe 31 and a second indoor unit connection pipe 32.

The first heat exchanger water pipe 130 may be connected to the first indoor unit connection pipe 31. Also, the first heat exchanger water pipe 130 may be coupled to a third port 110c of the heat exchanger 110. For example, when the air conditioning apparatus 1 performs the heating operation, water discharged from the indoor unit 50 may be introduced into the water passage 112 of the heat exchanger 110 through the first indoor unit connection pipe 31 and the first heat exchanger water pipe 130.

The second heat exchanger water pipe 140 may be connected to the second indoor unit connection pipe 32. Also, the second heat exchanger water pipe 140 may be coupled to a fourth port 110d of the heat exchanger 110. The third and fourth ports 110c and 110d may be disposed on both ends of the water passage 112.

The first and second ports 110a and 110b may be disposed on one surface of the heat exchanger 110, and the third and fourth ports 110c and 110d may be disposed on the other surface of the heat exchanger 110 with respect to the heat exchanger 110. Also, the first port 110a and the fourth port 110d may be disposed to face each other, and the second port 110b and the third port 110c may be disposed to face each other.

For example, when the air conditioning apparatus 1 performs the heating operation, the water discharged from the water passage 112 of the heat exchanger 110 may be introduced into the indoor unit 50 through the second heat exchanger water pipe 140 and the second indoor unit connection pipe 32.

The indoor unit 50 includes an indoor heat exchanger 51 and an indoor fan 55. The indoor fan 55 may be disposed adjacent to the indoor heat exchanger 51 to blow indoor air so that the water passing through the indoor heat exchanger 51 is heat-exchanged with the indoor air.

The first indoor unit connection pipe 31 may be connected to an outlet-side of the indoor heat exchanger 51. Also, the second indoor unit connection pipe 32 may be connected to an inlet-side of the indoor heat exchanger 51.

A pump 132 forcing a flow of water may be installed in the first heat exchanger water pipe 130. When the pump 132 is driven, the water may circulate through the water-side passage connecting the indoor unit 50 to the heat exchanger 110, i.e., through the indoor heat exchanger 51, the first indoor unit connection pipe 31, the first heat exchanger water pipe 130, the water passage 112, the second heat exchanger water pipe 140, and the second indoor unit connection pipe 32.

In FIG. 2, although the pump 132 is installed in the first heat exchanger water pipe 130, the implementation is not limited thereto. For example, the pump 132 may be installed in the second heat exchanger water pipe 140.

A first branch part 133 to which a first bypass pipe 150 is coupled is provided in the first heat exchanger water pipe 130. Also, a first combining part 143 to which the first bypass pipe 150 is coupled is provided in the second heat exchanger water pipe 140. The first bypass pipe 150 may extend from the first branch part 133 to the first combining part 143. That is, both ends of the first bypass pipe 150 may be coupled to the first branch part 133 and the first combining part 143.

For example, when the air conditioning apparatus 1 performs the cooling operation, the water discharged from the indoor unit 50 may flow to the first heat exchanger water pipe 130 and then flow from the first branch part 133 to the first bypass pipe 150.

A second branch part 134 to which a second bypass pipe 160 is coupled is provided in the first heat exchanger water pipe 130. Also, a second combining part 144 to which the second bypass pipe 160 is coupled is provided in the second heat exchanger water pipe 140. The second bypass pipe 160 may extend from the second branch part 134 to the second combining part 144. That is, both ends of the second bypass pipe 160 may be coupled to the second branch part 134 and the second combining part 144.

For example, when the air conditioning apparatus 1 performs the cooling operation, the water discharged from the third port 110c of the heat exchanger 110 may flow to the first heat exchanger water pipe 130 and then flow from the second branch part 134 to the second bypass pipe 160.

A first switching valve 135 may be installed in the first heat exchanger water pipe 130. For example, the first switching valve 135 may include a solenoid valve that is capable of being controlled to be turned on or off.

The first switching valve 135 may be installed at one point of the first heat exchanger water pipe 130 between the first branch part 133 and the second branch part 134.

For example, when the air conditioning apparatus 1 performs the cooling operation, since the first switching valve 135 is turned off to be closed, the water discharged from the indoor unit 50 may flow from the first branch part 133 to the first bypass pipe 150, and the water discharged from the third port 110c of the heat exchanger 110 may flow from the second branch part 134 to the second bypass pipe 160.

A second switching valve 145 may be installed in the second heat exchanger water pipe 140. For example, the second switching valve 145 may include a solenoid valve. The second switching valve 145 may be installed at one point of the second heat exchanger water pipe 140 between the first combining part 143 and the second combining part 144.

For example, when the air conditioning apparatus 1 perform the cooling operation, since the second switching valve 145 is turned off to be closed, the water flowing through the first bypass pipe 150 may be restricted in flow from the first combining part 143 to the indoor unit 50 but may flow to the heat exchanger 110. Also, the water flowing through the second bypass pipe 160 may be restricted in flow from the second combining part 144 to the heat exchanger 110 but may flow to the indoor unit 50.

A third switching valve 155 may be installed in the first bypass pipe 150. For example, the third switching valve 155 may include a solenoid valve. When the third switching valve 155 is turned on to be opened, the water may flow through the first bypass pipe 150. When the third switching valve 155 is turned off to be closed, the flow of water through the first bypass pipe 150 may be restricted.

A fourth switching valve 165 may be installed in the second bypass pipe 160. For example, the fourth switching valve 165 may include a solenoid valve. When the fourth switching valve 165 is turned on to be opened, the water may flow through the second bypass pipe 160. When the fourth switching valve 165 is turned off to be closed, the flow of water through the second bypass pipe 160 may be restricted.

Figure 3:
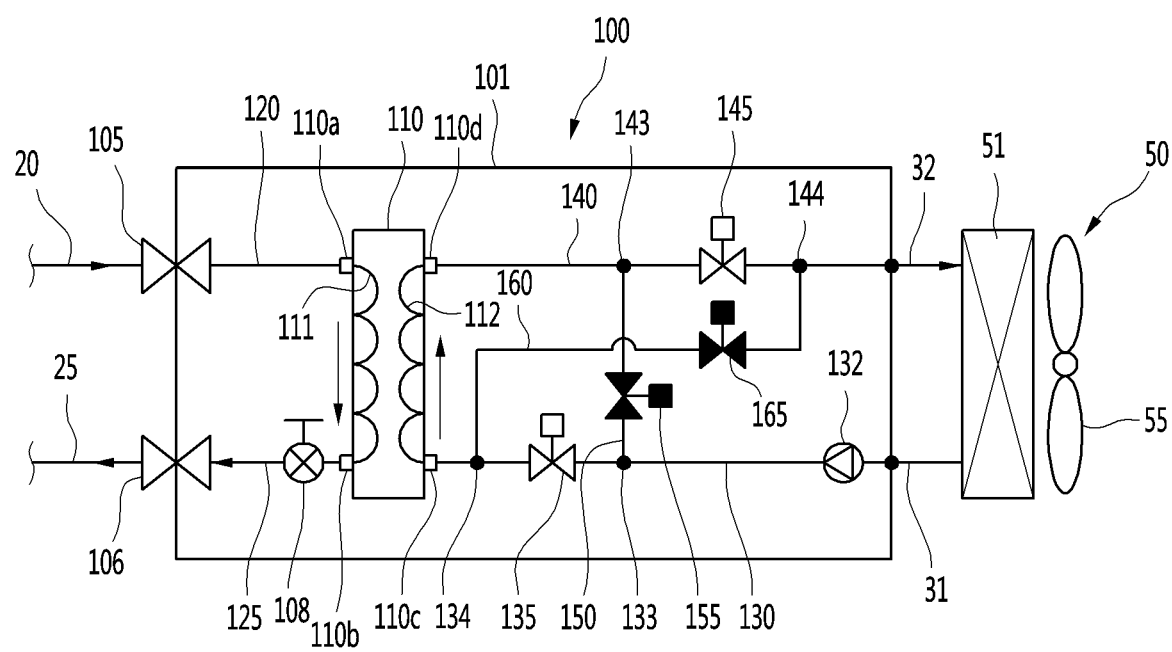
FIG. 3 is a cycle diagram illustrating an example of a flow of refrigerant in the heat exchange device of FIG. 2 during a heating operation.
Figure 4:
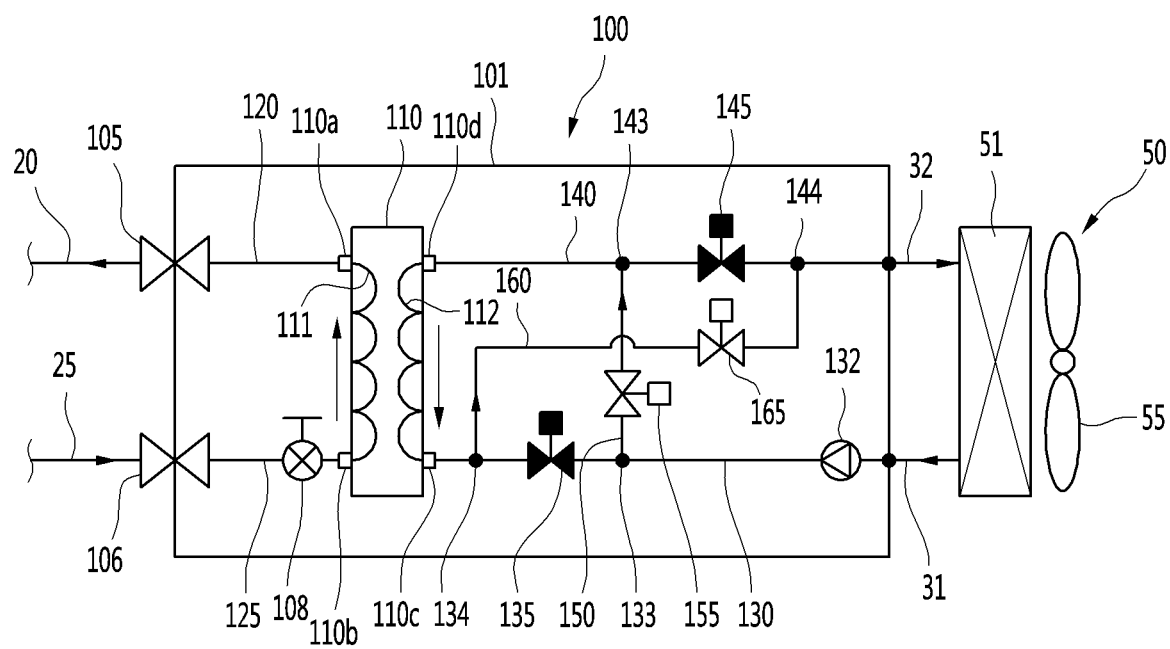
FIG. 4 is a cycle diagram illustrating an example of a flow of refrigerant in the heat exchange device of FIG. 2 during a cooling operation.

FIG. 3 is a cycle diagram illustrating an example of a flow of refrigerant in the heat exchange device during the heating operation of the air conditioning apparatus, and FIG. 4 is a cycle diagram illustrating an example of a flow of refrigerant in the heat exchange device during the cooling operation of the air conditioning apparatus.

First, referring to FIG. 3, when the heating operation is performed in the air conditioning apparatus 1, in view of the flow of refrigerant, the high-pressure gas refrigerant compressed in the compressor 11 of the outdoor unit 10 is introduced into the first heat exchanger refrigerant pipe 120 through the first outdoor unit connection pipe 20.

The refrigerant of the first heat exchanger refrigerant pipe 120 may be introduced into the heat exchanger 110 through the first port 110a. The refrigerant may be condensed while being heat-exchanged with the water in the heat exchanger 110 and then be discharged to the second heat exchanger refrigerant pipe 125 through the second port 110b.

The refrigerant may not be decompressed while passing through the internal expansion valve 108. Here, the internal expansion valve 108 may be in a full-open state. The refrigerant passing through the internal expansion valve 108 may be introduced into the outdoor unit 10 via the second outdoor unit connection pipe 25 and be decompressed in the main expansion valve 18 and then be evaporated in the outdoor heat exchanger 15. Also, the evaporated refrigerant may be compressed in the compressor 11 and then be introduced into the heat exchange device 100 through the first outdoor unit connection pipe 20. This refrigerant circulation may be performed.

In summary, when the air conditioning apparatus 1 performs the heating operation, the heat exchanger 110 may serve as a "condenser" that condenses the high-pressure gas refrigerant. Also, in the heat exchanger 110, a flow of refrigerant passing through the first port 110a, the refrigerant passage 111, and the second port 110b may be generated (from an upper side to a lower side of the heat exchanger in FIG. 3).

Next, a flow of water will be described.

When the pump 132 is driven, the water discharged from the indoor heat exchanger 51 of the indoor unit 50 may flow through the first heat exchanger water pipe 130 and then be introduced into the water passage 112 of the heat exchanger 110 through the third port 110c.

While the water flows through the water passage 112, the water may be heat-exchanged with the refrigerant flowing through the refrigerant passage 111. In this process, the water may be heated. The heated water may be discharged from the heat exchanger 110 through the fourth port 110d to flow through the second heat exchanger water pipe 140 and then be introduced into the indoor unit 50. That is, the heated water may be supplied to the indoor unit 50 to perform the heating.

During the heating operation, the first switching valve 135 and the second switching valve 145 may be turned on to be opened, and the third switching valve 155 and the fourth switching valve 165 may be turned off to be closed.

When the air conditioning apparatus 1 performs the heating operation, in the heat exchanger 110, a flow of water passing through the third port 110c, the water passage 112, and the fourth port 110d may be generated (from the lower side to the upper side of the heat exchanger in FIG. 3). Thus, in the heat exchanger 110, a counter flow may be generated between the water and the refrigerant to improve the heat exchange performance.

Next, referring to FIG. 4, when the cooling operation is performed in the air conditioning apparatus 1, the high-pressure liquid refrigerant condensed in the outdoor heat exchanger 15 of the outdoor unit 10 is introduced into the second heat exchanger refrigerant pipe 125 through the second outdoor unit connection pipe 25.

The refrigerant of the second heat exchanger refrigerant pipe 125 may be decompressed while passing through the internal expansion valve 108 and then be phase-changed into a low-pressure two phase refrigerant. Here, a degree of opening of the internal expansion valve 108 may be adjusted to be lowered to a set degree of opening.

The refrigerant decompressed in the internal expansion valve 108 may be introduced into the heat exchanger 110 through the second port 110b. The refrigerant may be evaporated while being heat-exchanged with the water in the heat exchanger 110 and then be discharged to the first heat exchanger refrigerant pipe 120 through the first port 110a.

The refrigerant of the first heat exchanger refrigerant pipe 120 may be introduced into the outdoor unit 10 through the first outdoor unit connection pipe 20 and then be suctioned into the compressor 11. The high-pressure refrigerant compressed in the compressor 11 is condensed in the outdoor heat exchanger 15, and the condensed liquid refrigerant is introduced into the second heat exchanger refrigerant pipe 125 through the second outdoor unit connection pipe 25. This refrigerant circulation may be performed.

In summary, when the air conditioning apparatus 1 performs the cooling operation, the heat exchanger 110 may serve as an "evaporator" that evaporates the low-pressure two-phase refrigerant. Also, in the heat exchanger 110, a flow of refrigerant passing through the second port 110*b*, the refrigerant passage 111, and the first port 110*a* may be generated. For example, the refrigerant may flow from a lower side to an upper side of the heat exchanger in FIG. 4.

Next, a flow of water will be described.

When the pump 132 is driven, the water discharged from the indoor heat exchanger 51 of the indoor unit 50 may flow through the first heat exchanger water pipe 130 and then flow from the first branch part 133 to the first bypass pipe 150. Here, since the first switching valve 135 is turned off to be closed, a flow of water from the first branch part 133 to the second branch part 134 may be restricted. Also, the third switching valve 155 may be turned on to be opened.

The water of the first bypass pipe 150 may flow from the first combining part 143 to the second heat exchanger water pipe 140 and then flow to the water passage 112 of the heat exchanger 110 through the fourth port 110*d*. Here, since the second switching valve 145 is turned off to be closed, a flow of water from the first combining part 143 to the second combining part 144 may be restricted.

While the water flows through the water passage 112, the water may be heat-exchanged with the refrigerant flowing through the refrigerant passage 111. In this process, the water may be cooled. The cooled water may be discharged from the heat exchanger 110 through the third port 110*c* to flow through the first heat exchanger water pipe 130.

The water of the first heat exchanger water pipe 130 flows from the second branch part 134 to the second bypass pipe 160. Here, since the first switching valve 135 is turned off to be closed, a flow of water from the second branch part 134 to the first branch part 133 may be restricted. Also, the fourth switching valve 165 may be turned on to be opened.

The water of the second bypass pipe 160 may flow from the second combining part 144 to the second heat exchanger water pipe 140 and then be introduced into the indoor unit 50. That is, the cooled water may be supplied to the indoor unit 50 to perform the cooling.

When the air conditioning apparatus 1 performs the cooling operation, in the heat exchanger 110, a flow of water passing through the fourth port 110*d*, the water passage 112, and the third port 110*c* may be generated (from the upper side to the lower side of the heat exchanger in FIG. 4). Thus, in the heat exchanger 110, a counter flow may be generated between the water and the refrigerant to improve the heat exchange performance.

Figure 5A:
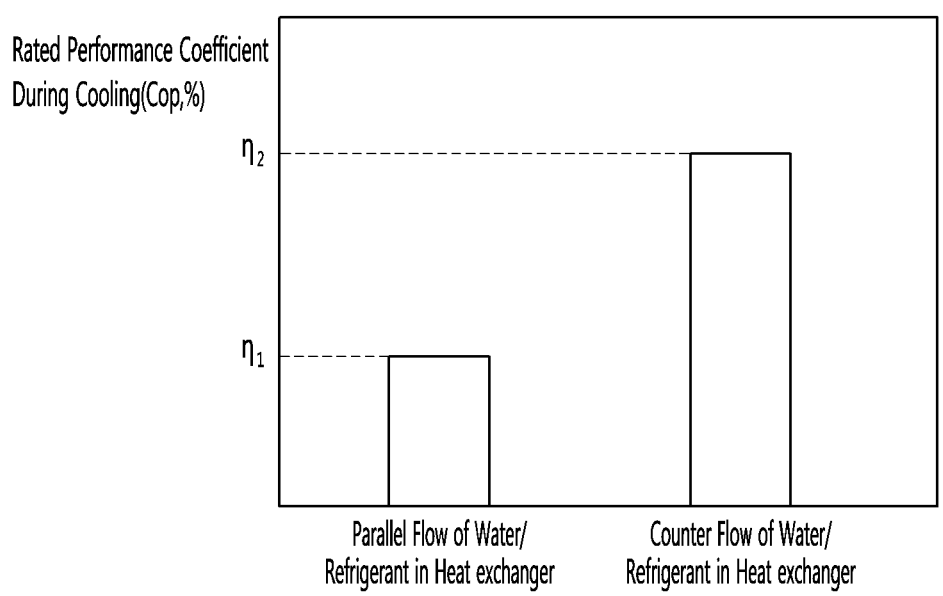
FIGS. 5A and 5B are experimental graphs illustrating an example of a difference in a rated performance coefficient according to flow directions of water/refrigerant in a heat exchanger during a cooling operation or a heating operation of the air conditioning apparatus.
Figure 5B:
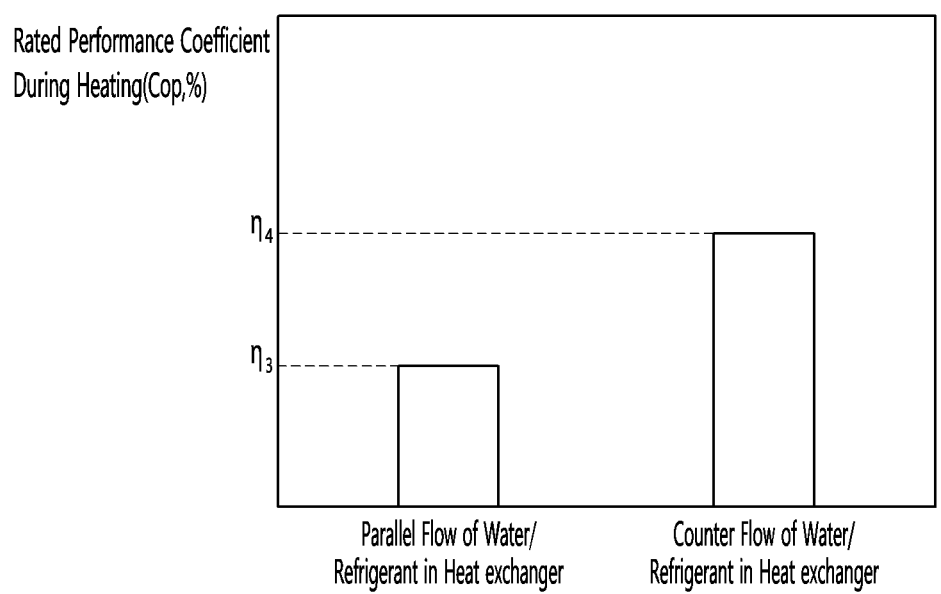

FIGS. 5A and 5B are experimental graphs illustrating examples of a difference in a rated performance coefficient according to flow directions of water/refrigerant in a heat exchanger during a cooling operation or a heating operation of the air conditioning apparatus.

FIG. 5A illustrates an example of a difference in a rated performance coefficient (CCP) between a case in which a counter flow is generated between a refrigerant and water in the heat exchanger 110 to perform heat exchange and a case in which a parallel flow is generated to perform heat exchange as a control group when the air conditioner apparatus performs the cooling operation, i.e., the heat exchanger 110 serves as the evaporator.

The counter flow represents that flow directions of the water and the refrigerant are opposite to each other, and the parallel flow represents that the flow directions of the water and the refrigerant are the same.

In detail, it is seen that a second rated performance coefficient $\eta 2$ when the counter flow is generated between the refrigerant and the water in the heat exchanger 110 is greater than a first rated performance coefficient $\eta 1$ when the parallel flow is generated, thereby improving performance of the system.

For example, the second rated performance coefficient $\eta 2$ ranges of about 120% to 125%, and the first rated performance coefficient $\eta 1$ ranges of about 97% to 102%.

FIG. 5B illustrates an example of a difference in a rated performance coefficient (CCP) between a case in which a counter flow is generated between a refrigerant and water in the heat exchanger 110 to perform heat exchange and a case in which a parallel flow is generated to perform heat exchange as a control group when the air conditioner apparatus performs the heating operation, i.e., the heat exchanger 110 serves as the evaporator.

In detail, it is seen that a fourth rated performance coefficient $\eta 4$ when the counter flow is generated between the refrigerant and the water in the heat exchanger 110 is greater than a third rated performance coefficient $\eta 3$ when the parallel flow is generated, thereby improving performance of the system.

For example, the fourth rated performance coefficient $\eta 4$ ranges of about 115% to 120%, and the third rated performance coefficient $\eta 3$ ranges of about 97% to 102%.

Hereinafter, a description will be made according to another implementation. Since the forgoing implementation are the same as another implementation except for only portions of the constitutions, different points therebetween will be described principally, and descriptions of the same parts will be denoted by the same reference numerals and descriptions of the foregoing implementation.

Figure 6:
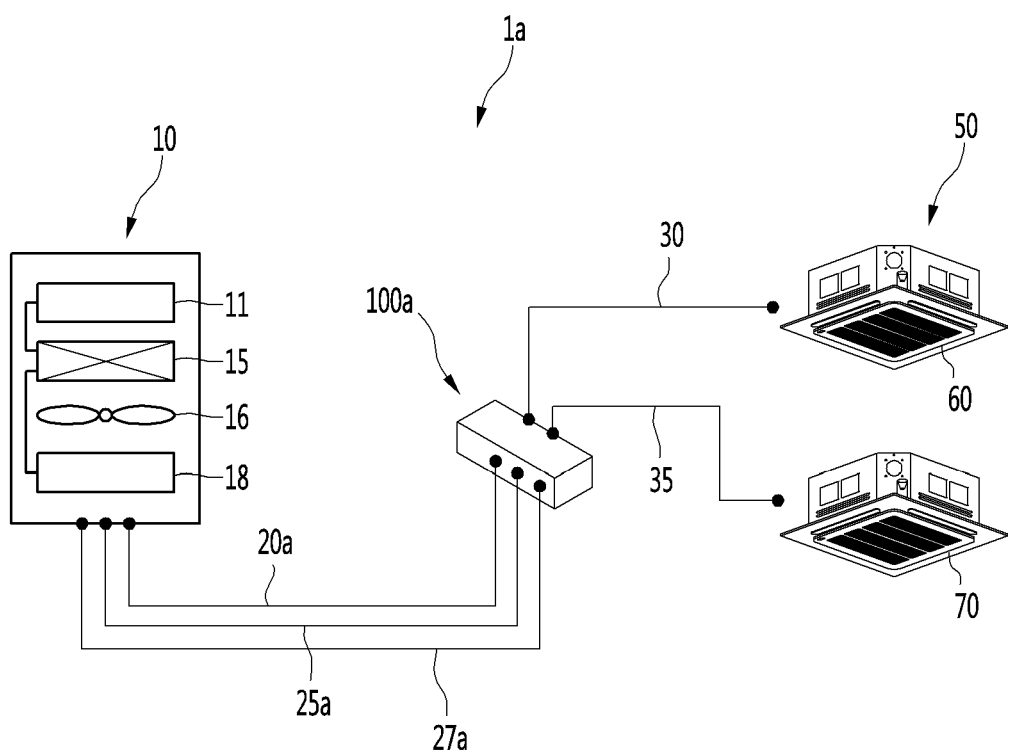
FIG. 6 is a schematic view illustrating an example of an air conditioning apparatus.
Figure 7:
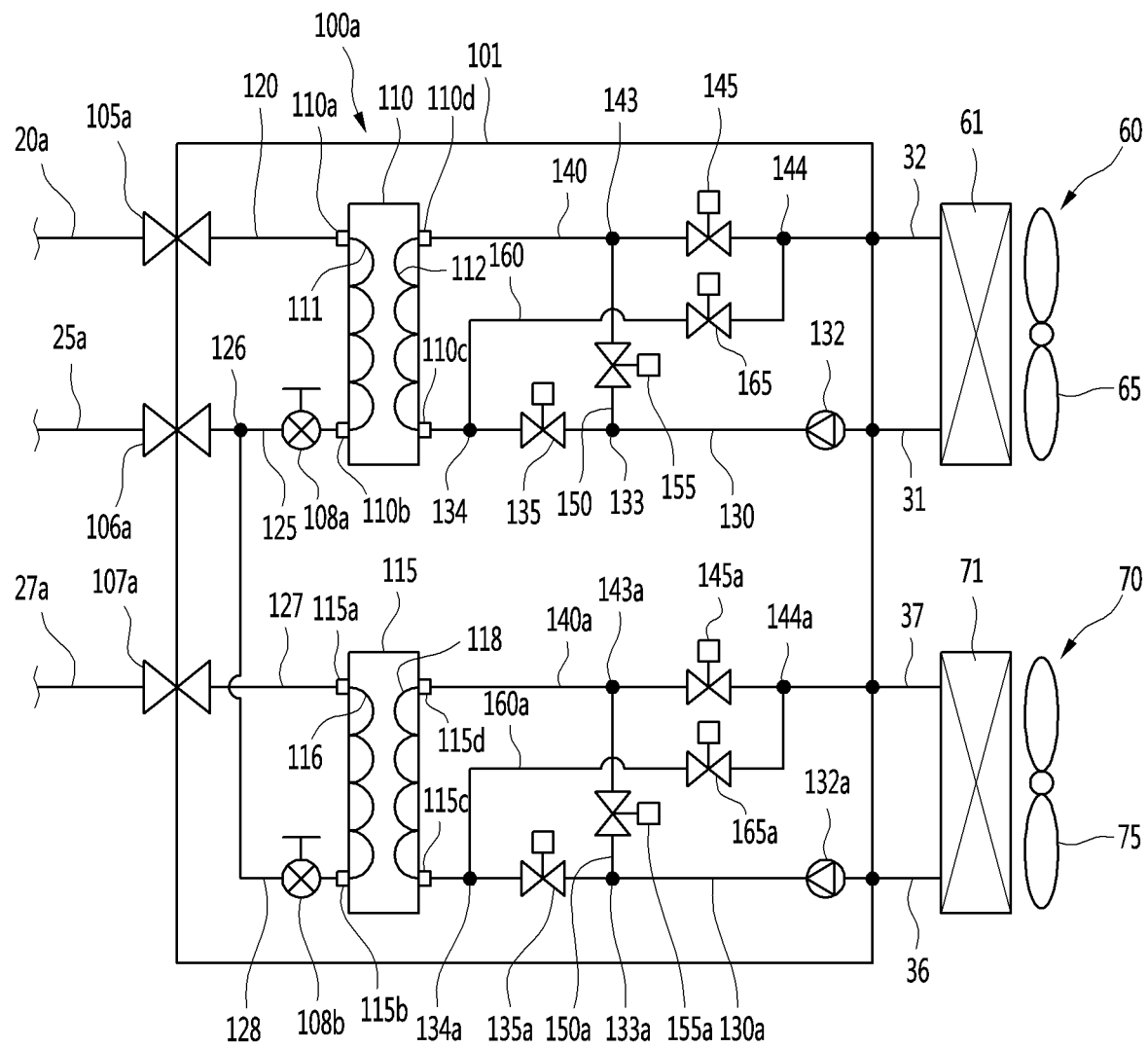
FIG. 7 is a cycle diagram illustrating an example of a heat exchange device.

FIG. 6 is a schematic view illustrating an example of an air conditioning apparatus, and FIG. 7 is a cycle diagram illustrating an example of a heat exchange device.

FIGS. 6 and 7, an air conditioning apparatus 1*a* includes an outdoor unit 10, an indoor unit 50, and a heat exchange device 100*a* connected to the outdoor unit 10 and the indoor unit 50.

The outdoor unit 10 and the heat exchange device 100*a* may be fluidly connected by a first fluid. For example, the first fluid may include a refrigerant. The refrigerant may flow through a refrigerant-side passage of a heat exchanger provided in the heat exchange device 100 and the outdoor unit 10.

The outdoor unit 10 may include a compressor 11, an outdoor heat exchanger 15, an outdoor fan 16, and a main expansion valve 18 (EEV). The above-described parts will be quoted from the descriptions of the foregoing implementation.

The air conditioning apparatus 1*a* further include three pipes 20*a*, 25*a*, and 27*a* connecting the outdoor unit 10 to the heat exchange device 100*a*. The three pipes 20*a*, 25*a*, and 27*a* include a first outdoor unit connection pipe 20*a* as a gas pipe (a high-pressure gas pipe) through which a high-pressure gas refrigerant flows, a second outdoor unit connection pipe 25*a* as a liquid pipe through a liquid refrigerant flows, and a third outdoor unit connection pipe 27*a* as a gas pipe (a low-pressure gas pipe) through which a low-pressure gas refrigerant flows.

That is, the outdoor unit 10 and the heat exchange device 100*a* may have a "three pipe connection structure," and the refrigerant may circulate through the outdoor unit 10 and the heat exchange device 100*a* via the three pipes 20*a*, 25*a*, and 27*a*.

The heat exchange device 100*a* and the indoor unit 50 may be fluidly connected by a second fluid. For example, the second fluid may include water. The water may flow through a water-side passage of a heat exchanger provided in the heat exchange device 100*a* and the outdoor unit 10. The heat exchanger may include a plate-type heat exchanger. In some examples, the plate-type heat exchanger may include one or more plates that are stacked on top of one another and fluid (e.g., refrigerant, water, etc.) passages that are arranged between the one or more plates.

The indoor unit 50 may include a plurality of indoor units 60 and 70. The plurality of indoor units 60 and 70 include a first indoor unit 60 and a second indoor unit 70.

The air conditioning apparatus 1*a* further includes pipes 30 and 35 connecting the heat exchange device 100*a* to the indoor unit 50. The pipes 30 and 35 include two indoor unit connection pipes 30 and 35 connecting the heat exchange device 100*a* to the first and second indoor units 60 and 70.

The two indoor unit connection pipes 30 and 35 include a first connection pipe 30 connecting the heat exchange device 100*a* to the first indoor unit 60 and a second connection pipe 35 connecting the heat exchange device 100*a* to the second indoor unit 70.

The first connection pipe 30 includes the first and second indoor unit connection pipes 31 and 32, which are described according to the foregoing implementation. Also, the second connection pipe 35 includes first and second indoor unit connection pipes 36 and 37.

The water may be circulated through the heat exchange device 100*a* and the indoor unit 50 via the first and second connection pipes 30 and 35. Here, as the number of indoor units increases, the number of pipes connecting the heat exchange device 100*a* to the indoor units may also increase.

According to the above-described configuration, the refrigerant circulating through the outdoor unit 10 and the heat exchange device 100*a* and the water circulating through the heat exchange device 100*a* and the indoor unit 50 may be heat-exchanged with each other through heat exchangers 110 and 115 provided in the heat exchange device 100*a*, and water cooled or heated through the heat exchange may be heat-exchanged with indoor heat exchangers 61 and 72 provided in the indoor unit 50 to perform cooling or heating in an indoor space.

The heat exchange device 100*a* includes a first heat exchanger 110 fluidly connected to the first indoor unit 60 and a second heat exchanger 115 fluidly connected to the second indoor unit 70.

The heat exchange device 100*a* includes a first service valve 105*a* connected to the first outdoor unit connection pipe 20*a*, a second service valve 106*a* connected to the second outdoor unit connection pipe 25*a*, and a third service valve 107*a* connected to the third outdoor unit connection pipe 27*a*.

The first to third outdoor unit connection pipes 20*a*, 25*a*, and 27*a* may be connected to the heat exchange device 100*a* through the first to third service valves 105*a*, 106*a*, and 107*a*, and thus, the outdoor unit 10 and the heat exchange device 100*a* may realize "third pipe connection."

The first heat exchanger refrigerant pipe 120 extends from the first service valve 105*a* to a first port 110*a* of the first heat exchanger 110. Also, a second heat exchanger refrigerant pipe 125 extends from the second service valve 106*a* to a second port 110*b* of the first heat exchanger 110. A first internal expansion valve 108*a* may be installed in the second heat exchanger refrigerant pipe 125. The first internal expansion valve 108*a* may include an electronic expansion valve (EEV) that is capable of decompressing the refrigerant.

Descriptions with respect to the first heat exchanger 110 may be denoted by those of the heat exchanger 110 according to the foregoing implementation.

The first heat exchanger water pipe 130 extend from the third port 110*c* of the first heat exchanger 110 to the first indoor unit connection pipe 31, and the second heat exchanger water pipe 140 extends from the fourth port 110*d* of the first heat exchanger 110 to the second indoor unit connection pipe 32.

A pump 132 and a first switching valve 135 are installed in the first heat exchanger water pipe 130. A first bypass pipe 150 extends from a first branch part 133 of the first heat exchanger water pipe 130 and then is connected to a first combining part 143 of the second heat exchanger water pipe 140. The first switching valve 135 may be installed between the first and second branch parts 133 and 134. In some examples, the branch parts may be a connector (e.g., a three-way connector). In some examples, the branch parts may be a node or an opening defined in the first heat exchanger water pipe 130 and connected to the bypass pipe.

A second bypass pipe 160 extends from a second branch part 134 of the first heat exchanger water pipe 130 and then is connected to a second combining part 144 of the second heat exchanger water pipe 140.

A second switching valve 145 is installed in the second heat exchanger water pipe 140. The second switching valve 145 may be installed between the first and second combining parts 143 and 144 of the second heat exchanger water pipe 140. In some examples, the combining parts may be a connector (e.g., a three-way connector). In some examples, the combining parts may be a node or an opening defined in the second heat exchanger water pipe 140 and connected to the bypass pipe.

A third switching valve 155 is installed in the first bypass pipe 150, and a fourth switching valve 165 is installed in the second bypass pipe 160. Descriptions of the first to fourth switching valves 135, 145, 155, and 165 will be denoted from those in the foregoing implementation.

The heat exchanger device 100*a* further includes a third heat exchanger refrigerant pipe 127 connected to the third service valve 107*a*. That is, the third heat exchanger refrigerant pipe 127 may be connected to the third outdoor unit connection pipe 27*a* through the third service valve 107*a*.

The third heat exchanger refrigerant pipe 127 may be coupled to the first port 115*a* of the second heat exchanger 115 to communicate with a refrigerant passage 116 of the second heat exchanger 115.

The heat exchange device 100*a* further includes a fourth heat exchanger refrigerant pipe 128 extending from a refrigerant branch part 126 of the second heat exchanger refrigerant pipe 125 and then coupled to the second port 115*b* of the second heat exchanger 115.

The first internal expansion valve 108*a* may be installed at one point of the second heat exchanger refrigerant pipe 125 between the refrigerant branch part 126 and the second port 110*b* of the first heat exchanger 110.

A second internal expansion valve 108*b* may be installed in the fourth heat exchanger refrigerant pipe 128. The second internal expansion valve 108*b* may include an electronic expansion valve (EEV) that is capable of decompressing the refrigerant.

For example, when the air conditioning apparatus 1*a* performs a simultaneous operation, at least a portion of the refrigerant, which is condensed in the first heat exchanger 110 and discharged through the second port 110b, may be bypassed in the refrigerant branch part 126 to flow through the fourth heat exchanger refrigerant pipe 128 and then be introduced into the second heat exchanger 115 through the second port 115b of the second heat exchanger 115.

A third heat exchanger water pipe 130a extend from the third port 115c of the second heat exchanger 115 to the first indoor unit connection pipe 36, and the fourth heat exchanger water pipe 140a extends from a fourth port 115d of the second heat exchanger 115 to the second indoor unit connection pipe 37. The third and fourth heat exchanger water pipes 130a and 140a may communicate with a water passage 118 of the second heat exchanger 115.

A pump 132a and a fifth switching valve 135a are installed in the third heat exchanger water pipe 130a. The third bypass pipe 150a extends from the third branch part 133a of the third heat exchanger water pipe 130a and then is connected to the third combining part 143a of the fourth heat exchanger water pipe 140a. The fifth switching valve 135a may be installed between the third and fourth branch parts 133a and 134a.

Also, a fourth second bypass pipe 160a extends from the fourth branch part 134a of the third heat exchanger water pipe 130a and then is connected to a fourth combining part 144a of the fourth heat exchanger water pipe 140a.

A sixth switching valve 145a is installed in the fourth heat exchanger water pipe 140a. The sixth switching valve 145a may be installed between the third and fourth combining parts 143a and 144a of the fourth heat exchanger water pipe 140a.

A seventh switching valve 155a is installed in the third bypass pipe 150a, and an eighth switching valve 165a is installed in the fourth bypass pipe 160a. The fifth to eighth switching valves 135a, 145a, 155a, and 165a may have the same or similar configuration as the first to fourth switching valves 135a, 145a, 155a, and 165a.

As described above, the configurations of the first and second heat exchanger water pipes 130 and 140, the first and second bypass pipes 150 and 160, and the first to fourth switching valves 135, 145, 155, and 165 between the first heat exchanger 110 and the first indoor unit 60 may be the same as those of the third and fourth heat exchanger water pipes 130a and 140a, the third and fourth bypass pipes 150a and 160a, and the fifth to eighth switching valves 135a, 145a, 155a, and 165a between the second heat exchanger 115 and the second indoor unit 70.

Figure 8:
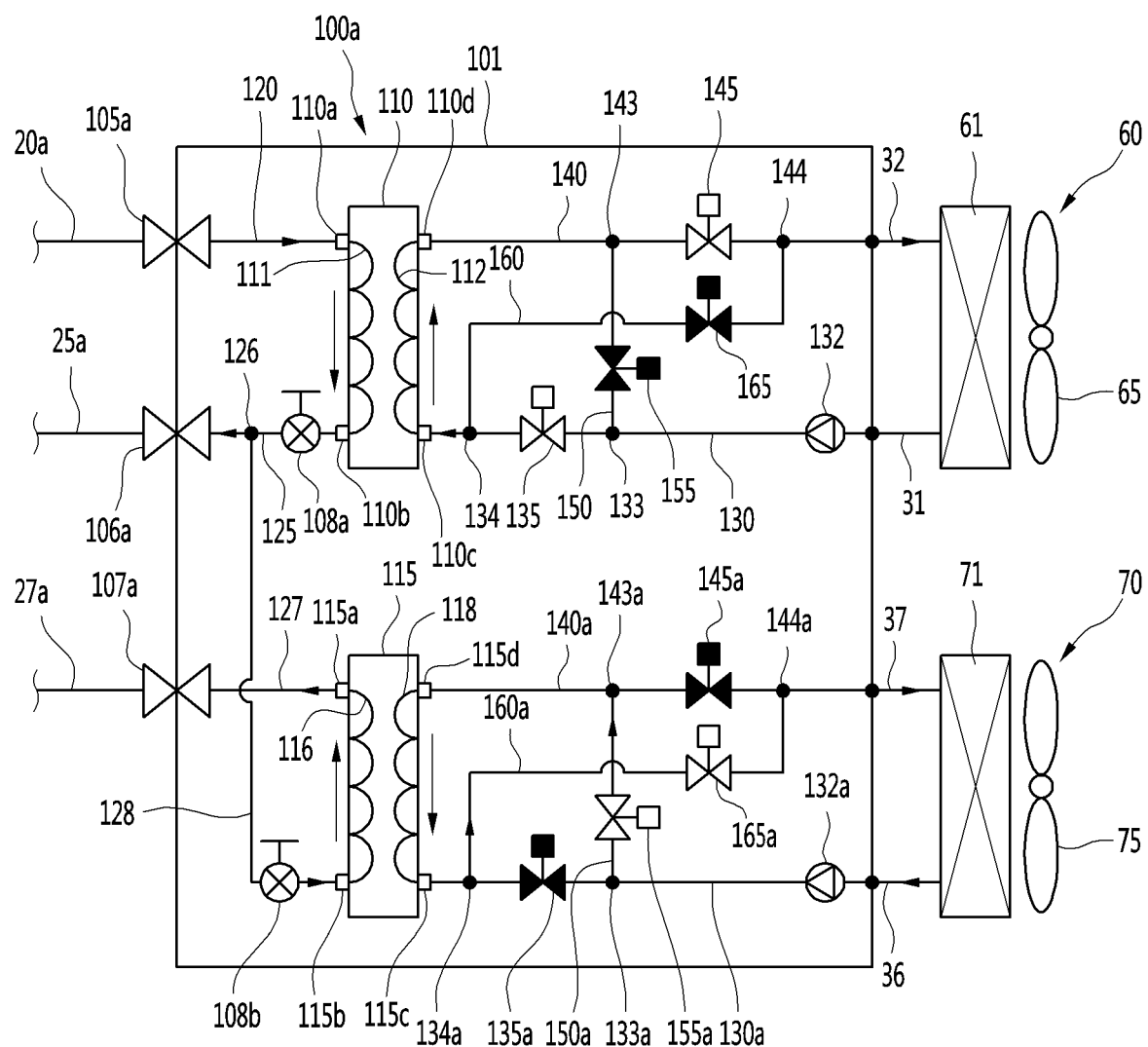
FIG. 8 is a cycle diagram illustrating an example of a flow of refrigerant in the heat exchange device of FIG. 7 during a heating operation.

FIG. 8 is a cycle diagram illustrating an example of a flow of refrigerant in the heat exchange device during the simultaneous operation of the air conditioning apparatus.

Referring to FIG. 8, when the simultaneous operation is performed in the air conditioning apparatus 1a, the high-pressure gas refrigerant compressed in the compressor 11 of the outdoor unit 10 is introduced into the first heat exchanger refrigerant pipe 120 through the first outdoor unit connection pipe 20a. Here, the "simultaneous operation" may be understood as an operation in which the heating is performed in the first indoor unit 60, and the cooling is performed in the second indoor unit 70.

The refrigerant of the first heat exchanger refrigerant pipe 120 may be introduced from the first port 110a into the first heat exchanger 110 to flow through the refrigerant passage 111 and then be heat-exchanged with the water so as to be condensed and be discharged from the second port 110b to flow through the second heat exchanger refrigerant pipe 125.

A portion of the refrigerant of the second heat exchanger refrigerant pipe 125 may be introduced into the outdoor unit 10 through the second outdoor unit connection pipe 25a and then be decompressed in the main expansion valve 18 and evaporated in the outdoor heat exchanger 15. Also, the refrigerant may be suctioned again into the compressor 11.

The remaining refrigerant of the second heat exchanger refrigerant pipe 125 may be bypassed in the refrigerant branch part 126 to flow through the fourth heat exchanger refrigerant pipe 128 and then be decompressed in the second internal expansion valve 108b and introduced again into the second heat exchanger 115 through the second port 115b. The refrigerant introduced into the second heat exchanger 115 may be heat-exchanged with the water so as to be evaporated while flowing through the refrigerant passage 116 and be discharged through the first port 115a and then be introduced into the outdoor unit 10 via the third outdoor unit connection pipe 27a. Also, the refrigerant introduced into the outdoor unit 10 may be suctioned into the compressor 11.

The water heated by being heat-exchanged with the refrigerant in the first heat exchanger 110 may be introduced into the first indoor unit 60 through the second heat exchanger water pipe 140 to perform the heating for the indoor space. Also, the water passing through the first indoor unit 60 may be introduced into the water passage 112 of the first heat exchanger 110 through the first heat exchanger water pipe 130 and then be heat-exchanged with the refrigerant. This water circulation may be performed. Here, the first and second switching valves 135 and 145 may be turned on to be opened, and the third and fourth valves 155 and 165 may be turned off to be closed.

Also, the water cooled by being heat-exchanged with the refrigerant in the second heat exchanger 115 may flow from the fourth branch part 134a of the third heat exchanger water pipe 130a to the second bypass pipe 160 and then be introduced from the fourth combining part 144a to the fourth combining part 144a to so as to be introduced into the second indoor unit 70. The water introduced into the second indoor unit 70 may be heat-exchanged with the refrigerant to perform the cooling for the indoor space.

Also, the water passing through the second indoor unit 70 may be introduced into the third heat exchanger water pipe 130a to flow from the third branch part 133a to the third bypass pipe 150a and then be introduced from the third combining part 143a to the fourth heat exchanger water pipe 140a.

The water of the fourth heat exchanger water pipe 140a may be introduced into the second heat exchanger 115 through the fourth port 115d to flow to the water passage 118. In this process, the water may be heat-exchanged with the refrigerant so as to be cooled. This water circulation may be performed. Here, the fifth and sixth switching valves 135a and 145a may be turned off to be closed, and the seventh and eighth switching valves 155a and 165a may be turned on to be opened.

According to the simultaneous operation, in the first heat exchanger 110, the refrigerant may flow through the first port 110a, the refrigerant passage 111, and the second port 110b, and the water may flow through the third port 110c, the water passage 112, and the fourth port 110d. Here, the counter flow between the water and the refrigerant may be generated.

Also, in the second heat exchanger 115, the refrigerant may flow through the second port 115b, the refrigerant passage 116, and the first port 115a, and the water may flow through the fourth port 115d, the water passage 118, and the third port 115c. Here, the counter flow between the water and the refrigerant may be generated. Thus, in the first and second heat exchangers 110 and 115, the counter flow may be generated between the water and the refrigerant to improve the heat exchange performance.

According to the implementation, the water passage may vary in the heat exchange device during the cooling operation or the heating operation to generate the counter flow between the water and the refrigerant so as to perform the heat exchange between the refrigerant and the water, thereby improving the heat exchange performance.

Also, when the switching operation for the cooling operation or the heating operation is performed, the outdoor unit and the heat exchange device may be connected to each other through the two pipes so as to be simplified in configuration thereof.

In some implementations, when the simultaneous operation in which the cooling operation and the heating operation are performed at the same time is performed, the outdoor unit and the heat exchange device may be connected to each other through the three pipes to easily perform the circulation of the refrigerant.

Also, the configuration of the heat exchange device connected to the outdoor unit through the two pipes and the configuration of the heat exchange device connected to the outdoor unit through the three pipes may be almost similar to each other except that the pipes are grounded so that the heat exchange device for the switching operation or the simultaneous operation is easily manufactured.

As a result, the heat exchange device may be connected to the outdoor unit through the two or three pipes to perform the switching operation or the simultaneous operation according to operation requirements, thereby improving a degree of freedom of installation.

Although implementations have been described with reference to a number of illustrative implementations thereof, it should be understood that numerous other modifications and implementations can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An air conditioning apparatus comprising:
   an outdoor unit configured to circulate refrigerant;
   at least one indoor unit configured to circulate water; and
   a heat exchange device that connects the outdoor unit to the at least one indoor unit, the heat exchange device comprising:
      at least one heat exchanger configured to exchange heat between the refrigerant and the water,
      a first heat exchanger water pipe that extends from the at least one heat exchanger toward an outlet of the at least one indoor unit and that is configured to guide water received from the at least one indoor unit to the at least one heat exchanger,
      a second heat exchanger water pipe that extends from the at least one heat exchanger toward an inlet of the at least one indoor unit and that is configured to guide water received from the at least one heat exchanger to the inlet of the at least one indoor unit,
      a first bypass pipe that extends from the first heat exchanger water pipe to the second heat exchanger water pipe and that is configured to guide the water received from the at least one heat exchanger through the first heat exchanger water pipe to the second heat exchanger water pipe,
      a second bypass pipe that extends from the first heat exchanger water pipe to the second heat exchanger water pipe and that is configured to guide the water received from the at least one indoor unit through the first heat exchanger water pipe to the second heat exchanger water pipe such that the water received from the at least one indoor unit is not introduced to the at least one heat exchanger,
      a first switching valve installed in the first bypass pipe and configured to open and close the first bypass pipe, and
      a second switching valve installed in the second bypass pipe and configured to open and close the second bypass pipe.

2. The air conditioning apparatus according to claim 1, wherein the first bypass pipe extends from a first branch part disposed at the first heat exchanger water pipe to a first connection disposed at the second heat exchanger water pipe.

3. The air conditioning apparatus according to claim 2, wherein the second bypass pipe extends from a second branch part disposed at the first heat exchanger water pipe to a second connection disposed at the second heat exchanger water pipe.

4. The air conditioning apparatus according to claim 3, wherein the second branch part is disposed between the heat exchanger and the first branch part of the first heat exchanger water pipe.

5. The air conditioning apparatus according to claim 3, further comprising a third switching valve installed in the first heat exchanger water pipe.

6. The air conditioning apparatus according to claim 5, wherein the third switching valve is installed between the first branch part and the second branch part of the first heat exchanger water pipe, the third switching valve being configured to:
   based on the air conditioning apparatus performing a first mode, open the first heat exchanger water pipe to allow the water in the first heat exchanger water pipe to be introduced into the at least one heat exchanger, and
   based on the air conditioning apparatus performing a second mode different from the first mode, close the first heat exchanger water pipe to allow the water in the first heat exchanger water pipe to move to the first bypass pipe.

7. The air conditioning apparatus according to claim 5, further comprising a fourth switching valve installed in the second heat exchanger water pipe.

8. The air conditioning apparatus according to claim 7, wherein the fourth switching valve is installed between the first connection and the second connection of the second heat exchanger water pipe, the fourth switching valve being configured to:
   based on the air conditioning apparatus performing a first mode, open the second heat exchanger water pipe to allow the water in the second heat exchanger water pipe to be introduced into the at least one indoor unit, and
   based on the air conditioning apparatus performing a second mode different from the second mode, close the second heat exchanger water pipe to block the water in the second heat exchanger water pipe from being introduced into the at least one indoor unit.

9. The air conditioning apparatus according to claim 1, further comprising:

a first outdoor unit connection pipe and a second outdoor unit connection pipe that connect the outdoor unit to the heat exchange device;

a first heat exchanger refrigerant pipe that is connected to the first outdoor unit connection pipe and that extends to a first port of the at least one heat exchanger; and a second heat exchanger refrigerant pipe that is connected to the second outdoor unit connection pipe and that extends to a second port of the at least one heat exchanger.

10. The air conditioning apparatus according to claim 9, wherein the first heat exchanger water pipe connects to a third port of the at least one heat exchanger, and wherein the second heat exchanger water pipe connects to a fourth port of the at least one heat exchanger.

11. The air conditioning apparatus according to claim 10, wherein the at least one heat exchanger comprises:

a refrigerant passage that extends from the first port to the second port and that is configured to guide the refrigerant in the at least one heat exchanger along a first direction; and a water passage that extends from the third port to the fourth port and that is configured to guide the water in the at least one heat exchanger along a second direction opposite to the first direction.

12. The air conditioning apparatus according to claim 10, wherein the first port and the second port are disposed at a first surface of the at least one heat exchanger, wherein the third port and the fourth port are disposed at a second surface of the at least one heat exchanger, and wherein the first port and the fourth port face each other, and the second port and the third port face each other.

13. The air conditioning apparatus according to claim 9, wherein the at least one indoor unit comprises a first indoor unit and a second indoor unit, wherein the at least one heat exchanger comprises a first heat exchanger fluidly connected to the first indoor unit and a second heat exchanger fluidly connected to the second indoor unit, and wherein the first heat exchanger refrigerant pipe and the second heat exchanger refrigerant pipe are connected to the first heat exchanger.

14. The air conditioning apparatus according to claim 13, further comprising:

a third outdoor unit connection pipe that connects the outdoor unit to the heat exchange device;

a third heat exchanger refrigerant pipe that is connected to the third outdoor unit connection pipe and that extends to a first port of the second heat exchanger; and a fourth heat exchanger refrigerant pipe that extends from the second heat exchanger refrigerant pipe to a second port of the second heat exchanger.

15. The air conditioning apparatus according to claim 14, further comprising an internal expansion valve installed in the fourth heat exchanger refrigerant pipe.

16. The air conditioning apparatus according to claim 1, wherein the at least one heat exchanger comprises one or more plates.

17. An air conditioning apparatus comprising:

an outdoor unit configured to circulate refrigerant;

a first indoor unit and a second indoor unit that are configured to circulate water; and a heat exchange device that connects the outdoor unit to the first and second indoor units, the heat exchange device comprising:

a first heat exchanger and a second heat exchanger that are configured to perform heat exchange between the refrigerant and the water, a plurality of heat exchanger water pipes that connect the first and second heat exchangers to the first and second indoor units, respectively, and that are configured to guide water (i) between the first indoor unit and the first heat exchanger and (ii) between the second indoor unit and the second heat exchanger, a plurality of outdoor unit connection pipes that connect the outdoor unit to the heat exchange device, a plurality of heat exchanger refrigerant pipes that are connected to the plurality of outdoor unit connection pipes and that extend to ports of the first and second heat exchangers, and at least one bypass pipe that connects the plurality of heat exchanger water pipes to each other and that is configured to bypass water flowing through one of the plurality of heat exchanger water pipes to another of the plurality of heat exchanger water pipes, wherein the plurality of outdoor unit connection pipes comprise at least three pipes that connect the outdoor unit to the plurality of heat exchanger refrigerant pipes, respectively.

18. The air conditioning apparatus according to claim 17, wherein the plurality of heat exchanger water pipes comprise a first heat exchanger water pipe and a second heat exchanger water pipe, and wherein the at least one bypass pipe comprises:

a first bypass pipe that extends from a first branch part disposed at the first heat exchanger water pipe to a first connection disposed at the second heat exchanger water pipe; and a second bypass pipe that extends from a second branch part disposed at the first heat exchanger water pipe to a second connection disposed at the second heat exchanger water pipe.

19. The air conditioning apparatus according to claim 17, wherein the plurality of outdoor unit connection pipes comprise a first outdoor unit connection pipe, a second outdoor unit connection pipe, and a third outdoor unit connection pipe, and wherein the plurality of heat exchanger refrigerant pipes comprise:

a first heat exchanger refrigerant pipe that is connected to the first outdoor unit connection pipe and that extends to a first port of the first heat exchanger;

a second heat exchanger refrigerant pipe that is connected to the second outdoor unit connection pipe and that extends to a second port of the first heat exchanger;

a third heat exchanger refrigerant pipe that is connected to the third outdoor unit connection pipe and that extends to a first port of the second heat exchanger; and a fourth heat exchanger refrigerant pipe that is branched from the second heat exchanger refrigerant pipe and that extends to a second port of the second heat exchanger.

20. The air conditioning apparatus according to claim 19, further comprising:

a first service valve connected to the first outdoor unit connection pipe and the first heat exchanger refrigerant pipe;

a second service valve connected to the second outdoor unit connection pipe and the second heat exchanger refrigerant pipe; and a third service valve connected to the third outdoor unit connection pipe and the third heat exchanger refrigerant pipe.

\* \* \* \* \*